(12) United States Patent
Chen et al.

(10) Patent No.: US 11,733,133 B2
(45) Date of Patent: Aug. 22, 2023

(54) KIND OF ONLINE $PM_{2.5}$ CONCENTRATED COLLECTION INSTRUMENT

(71) Applicant: FUDAN UNIVERSITY, Shanghai (CN)

(72) Inventors: Jianmin Chen, Shanghai (CN); Xiaona Shang, Shanghai (CN); Jianfeng Sun, Shanghai (CN); Ling Li, Shanghai (CN); Guodong Sui, Shanghai (CN); Chao Zhu, Shanghai (CN); Huihui Kang, Shanghai (CN)

(73) Assignee: Fudan University, Shanghai (CN)

( * ) Notice: Subject to any disclaimer, the term of this patent is extended or adjusted under 35 U.S.C. 154(b) by 30 days.

(21) Appl. No.: 17/385,051

(22) Filed: Jul. 26, 2021

(65) Prior Publication Data

US 2022/0026317 A1    Jan. 27, 2022

(30) Foreign Application Priority Data

Jul. 26, 2020    (CN) .......................... 202010727121.1

(51) Int. Cl.
*G01N 1/22*    (2006.01)
*G01N 1/28*    (2006.01)
(Continued)

(52) U.S. Cl.
CPC ......... *G01N 1/2202* (2013.01); *G01N 1/2273* (2013.01); *G01N 1/286* (2013.01);
(Continued)

(58) Field of Classification Search
CPC .... G01N 1/2202; G01N 1/2273; G01N 1/286; G01N 1/4022; G01N 1/4055;
(Continued)

(56) References Cited

U.S. PATENT DOCUMENTS

| 2002/0134137 A1* | 9/2002 | Ondov ............... G01N 15/0255 422/83 |
| 2004/0171480 A1* | 9/2004 | Hampden-Smith .... B82Y 30/00 502/185 |

* cited by examiner

*Primary Examiner* — Robert R Raevis
(74) *Attorney, Agent, or Firm* — Ware, Fressola, Maguire & Barber LLP

(57) ABSTRACT

A kind of online $PM_{2.5}$ concentrated collection instrument and method are provided including five parts: $PM_{2.5}$ cutting head, water tank system, virtual cropping system, condenser circulation system and online concentrated collection system. Connected with $PM_{2.5}$ cutting head, a water tank system contains water tank, electrical heating rod and temperature-controlled digital display device. Virtual cropping system contains virtual cutter, concentrated air vacuum pump, and main air vacuum pump. The condenser circulation system circulating condensate condenses to grow the saturated particles, condenser circulation system contains condensate circulation tube, condensing machine. The online concentrated collection system contains biological sampling bottle, solenoid valve with relay, automatic distillate collector and computer subdivision constant-current pump. Real $PM_{2.5}$ samples could be concentrated by this instrument to 7-10 times with high efficiency which would provide technical support for the following on-line chemical component or toxicity test.

6 Claims, 1 Drawing Sheet

(51) Int. Cl.
*G01N 1/40* (2006.01)
*G01N 15/02* (2006.01)

(52) U.S. Cl.
CPC ......... *G01N 1/4022* (2013.01); *G01N 1/4055* (2013.01); *G01N 15/02* (2013.01); *G01N 2001/2223* (2013.01); *G01N 2001/2873* (2013.01); *G01N 2001/4033* (2013.01)

(58) Field of Classification Search
CPC ........... G01N 15/02; G01N 2001/2223; G01N 2001/2873; G01N 2001/4033; G01N 1/2208
USPC ....... 73/28.04, 28.05, 28.06, 863.11, 863.12, 73/863.22
See application file for complete search history.

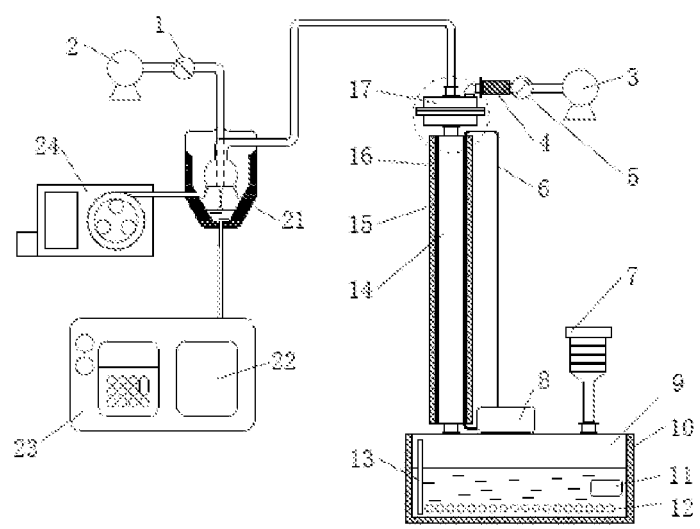
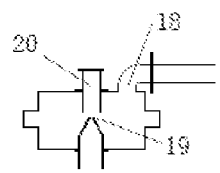

tion.

KIND OF ONLINE PM$_{2.5}$ CONCENTRATED COLLECTION INSTRUMENT

CROSS-REFERENCE TO RELATED APPLICATIONS

The present application claims priority to Chinese Patent Application No. 202010727121.1 filed Jul. 26, 2020, which is hereby incorporated by reference in its entirety.

FIELD OF THE DISCLOSURE

This present application relates to a kind of online PM$_{2.5}$ concentrated collection instrument and method.

BACKGROUND OF THE DISCLOSURE

PM$_{2.5}$ refers to particles with aerodynamic size less than 2.5 μm. Although PM$_{2.5}$ is only a small fraction of the earth's atmospheric composition, it has an important impact on air quality and visibility. In the atmosphere, PM$_{2.5}$ has small particle size and large specific surface area which contain a large number of toxic and harmful substances. PM$_{2.5}$ could be suspended in the air for a long time and transmitted to long distance. As for this, we should pay more attention to its influence to surrounding environment and human health.

In recent years, severe PM$_{2.5}$ pollution in China led to a sharp rise in the number of medical consultations and premature deaths among vulnerable people. Toxic and harmful chemical components in haze aerosol particles endangered the inhabitant health causing high concern of the whole society. Large amounts of epidemiological evidence showed that PM$_{2.5}$ had acute and chronic health effects. High levels of PM$_{2.5}$ exposure increased the risk of acute respiratory and cardiovascular diseases. PM$_{2.5}$ could also cause chronic diseases such as lung cancer, chronic obstructive pneumonia (COPD), cardiovascular and cerebrovascular diseases, and affect the human immune system and nervous system. Therefore, research on toxicity of aerosol particle had become one of the hotspots and frontiers in recent years. Due to the testing technology and equipment constraints, measurement of atmospheric fine particle toxicity was still in the off-line detection stage and needed to be carried out under the condition of heavy pollution and long continuous sampling time. As for this, it was hard to meet the requirement of real-time monitoring of atmospheric fine particle concentration and toxic chemical composition characteristics.

SUMMARY OF THE DISCLOSURE

The present application puts forward a new kind of online PM$_{2.5}$ concentrated collection instrument and method with high concentration efficiency and stable concentration performance.

This kind of online PM$_{2.5}$ concentrated collection method was specialized in the assessment procedure. The condensed factor and condensed efficiency were used to assess. The condensed factor equaled to the concentration of particles after the concentration/the original concentration of particles which included mass concentration, number concentration and chemical compounds concentration. The condensed efficiency equaled to actual concentration ratio/theoretical concentration ratio.

BRIEF DESCRIPTION OF THE FIGURE

The FIGURE shows an online PM$_{2.5}$ concentrated collection instrument in accordance with the present application.

Various reference numerals are identified in the FIGURE, including: 1 float flowmeter, 2 concentrated gas vacuum pump, 3 main gas vacuum pump, 4 drying pipe, 5 mass flow controller, 6 condensing circulation tube, 7 PM$_{2.5}$ cutting head, 8 condenser, 9 water tank, 10 temperature insulation layer, 11 viewing window, 12 an electrical heating rod with a temperature sensor, 13 temperature-controlled digital display device, 14 condensing inner tube, 15 soft copper spiral tube, 16 insulation layer, 17 virtual cutter, 18 main part gas outlet, 19 nozzle, 20 nozzle receiver, 21 biological sampling bottle, 22 solenoid valve with relay, 23 automatic distillate collector, 24 computer subdivision constant-current pump.

DETAILED DESCRIPTION OF THE FIGURE

As shown in the FIGURE, this kind of online PM$_{2.5}$ concentrated collection instrument includes five parts: PM$_{2.5}$ cutting head, water tank system, virtual cropping system, condenser circulation system and online concentrated collection system.

PM$_{2.5}$ cutting head (7) contains three level of cutting head: PM$_{10}$, PM$_5$ and PM$_{2.5}$. Each stage consists of an impact orifice plate and an impact separation collector plate. The structure of the three stage impact separation collection plate is the same. However, because of the different impact inertia of the particles with different particle sizes, the number and aperture of the three-stage impact plates are different.

The water tank (9) in water tank system is used to hold deionized water. The inner wall of the water tank (9) is provided with a temperature insulation layer (10), which is used for heat preservation of the deionized water in the water tank (9). A viewing window (11) is provided on one side of the tank (9) for observing the water surface height inside the tank. The water tank (9) contains an electrical heating rod (12) with a temperature sensor for heating deionized water. The water tank (9) is equipped with a temperature-controlled digital display device (13) for controlling the temperature of deionized water. The water tank system was connected with PM$_{2.5}$ cutting head.

Virtual cropping system contains virtual cutter (17), concentrated air vacuum pump (2), main air vacuum pump (3). The virtual cutter (17) consists of a nozzle (19), a nozzle receiver (20) and two gas paths: main gas path and concentrated gas path. Coaxial set with nozzle (19), the nozzle receiver (20) is put upside to receive the particles sprayed out from it. The main gas vacuum pump (3) is connected with the upper main part gas outlet (18) of the virtual cutter (17) through the pipeline. This connecting pipe contains a drying pipe (4) and a mass flow controller (5). The drying pipe (4) is used to dry the airflow to avoid excessive water vapor damage the pump body. The mass flow controller is used to precisely control the pipe flow. Concentrated air vacuum pump (2) is connected with the upper concentrated part gas outlet of the virtual cutter (17). This connecting pipe contains a float flowmeter which is used to calculate the pipe flow.

Condenser circulation system contains condensate circulation tube (6), condensing machine (8). The condensing circulation tube (6) includes a condensing inner tube (14) which is tightly wound by a soft copper spiral tube (15). The ends of this spiral pipe (15) are connected with the outlet and inlet of the condenser (8), respectively. An insulation layer (16) is enclosed outside the spiral tube (15) to keep the temperature of the condensing tube independent of the external temperature. This condenser circulation system uses circulating condensate condenses to grow up the saturated particles.

The flow outlet of the water tank (9) is coaxially arranged with the beginning of the condensing inner tube (14) in the condensing circulation system and connected by quick flange. The ending of the condensing inner tube (14) is connected with the nozzle (19) in virtual cropping system.

Online concentrated collection system contains biological sampling bottle (21), solenoid valve with relay (22), automatic distillate collector (23) and computer subdivision constant-current pump (24). Connected with condensing circulation tube (6) and virtual cutter (17), the biological sampling bottle (21) is used to online connect the concentrated saturated particles with deionized water or other organic solvents. There are two four-channel computer subdivision constant-current pump (24): one is used to add solvents into the biological sampling bottle (21), the other is used to suck the concentrated $PM_{2.5}$ samples from the biological sampling bottle (21). Solenoid valve with relay (22) is set between the two computer subdivision constant-current pump (24) to make them work at the same time. The concentrated $PM_{2.5}$ samples sucked by constant-current pump (24) is collected into a sample tube on a test-tube turntable by automatic distillate collector (23) preparing to make other analysis.

The working procedures of this kind of online $PM_{2.5}$ concentrated collection instrument were described as follows:

1. Put the $PM_{2.5}$ cutting head (7) in real atmospheric environment. Particles with aerodynamic size less than 2.5 μm was selected, then sucked into the water tank (9).

2. Under the viewing window (11), added deionized water to two thirds of the water tank, then used the electrical heating rod (12) to heat the water. Made the water at 45±2° C. by temperature-controlled digital display device (13) and kept the particles in condition of saturation by vapor.

3. When the particles in condition of saturation flew through condensing inner tube (14) whose temperature was kept in −19±1° C., the particles could condense and grow up to 3-4 μm.

4. The condensed particles moved into the virtual cutter (17) and got speed from the nozzle (19). The power to get speed come from two gas paths: main gas path and concentration gas path. In main gas path, a mass flow controller (5) controlled the flow at 50 L/min exactly. In concentration gas path whose flow was 5 L/min exactly, particles were received by the nozzle receiver (20). Theoretically, as the gas flow dropped to one tenth, the concentration of particle concentrated to 10 times.

5. The biological sampling bottle (21) was used to online connect the concentrated saturated particles with deionized water or other organic solvents. There were two four-channel computer subdivision constant-current pump (24): one was used to add solvents into the biological sampling bottle (21) (work 1 minute to add 5-10 ml solvents), the other was used to suck the concentrated $PM_{2.5}$ samples from the biological sampling bottle (21) (work 1 minute to collect 5-10 ml samples). Solenoid valve with relay (22) was set between the two computer subdivision constant-current pump (24) to make them work at the same time (open 1 minute, close 59 minutes). The concentrated $PM_{2.5}$ samples sucked by constant-current pump (24) was collected into a sample tube on a test-tube turntable by automatic distillate collector (23) preparing to make other analysis.

The condensing agent of condensing machine was alcohol. The concentration of this alcohol could be adjusted to reach the effect of cooling and reducing volatilization.

The length of condensing inner tube (14) was 80 cm and diameter was 2.5 cm.

The mass flow controller (5) could control the flow from 0 to 200 L/min

The diameter of this nozzle was 0.37 cm. The distance between the nozzle (19) and the nozzle receiver (20) was 0.45 cm. The diameter of this nozzle receiver was 2.5 cm.

Beneficial effects of this system and instrument described in the present application include:

(1) This instrument could concentrate the real $PM_{2.5}$ samples into 7-10 times. It got high concentration efficiency (75-99%) and stable concentration performance.

(2) With the middle flow of 50 L/min, this instrument could concentrate the real $PM_{2.5}$ samples in high concentration efficiency.

(3) No need to dry, samples collected by this instrument could directly prepare to make other online/offline analysis.

(4) Realizing the online collection of concentrated samples, it could give technical support to toxic chemical composition measurements.

(5) This instrument was stable, easy to operate and cost low price.

TABLE 1

Enrichment Efficiency of Different Particle Size Particles in Real Atmospheric Environment

| Particle Size | Condensation (−19 ± 1° C.) | Saturation (−45 ± 2° C.) | Main Air Flow (50 ± 1 L min-1) | Concentration Flow Efficiency (1/10) | Total Enrichment Efficiency |
|---|---|---|---|---|---|
| 30-50 nm | 99% | 85% | 97% | 97% | 98% |
| 50-100 nm | 100% | 85% | 99% | 99% | 91% |
| 100-200 nm | 85% | 82% | 78% | 80% | 79% |
| 200-1000 nm | NA | NA | NA | NA | 75% |
| Average Value | | | | | 86% |
| Standard Deviation | | | | | 7% |

Mode of Carrying Out the Disclosure

Example 1

1. Put the $PM_{2.5}$ cutting head (7) in 6 floor outside the window. Particles with aerodynamic size less than 2.5 μm was selected, then sucked into the water tank (9).

2. Under the viewing window (11), added deionized water to two thirds of the water tank, then used the electrical heating rod (12) to heat the water. Made the water at 45±2° C. by temperature-controlled digital display device (13) and kept the particles in condition of saturation by vapor.

3. When the particles in condition of saturation flew through condensing inner tube (14) whose temperature was kept in −19±1° C., the particles could condense and grow up to 3-4 μm.

4. The condensed particles moved into the virtual cutter (17) and got speed from the nozzle (19). The power to get speed come from two gas paths: main gas path and concentration gas path. In main gas path, a mass flow controller (5) controlled the flow at 50 L/min exactly. In concentration gas path whose flow was 5 L/min exactly, particles were received by the nozzle receiver (20). Theoretically, as the gas flow dropped to one tenth, the concentration of particle concentrated to 10 times.

5. The biological sampling bottle (21) was used to online connect the concentrated saturated particles with deionized water or other organic solvents. There were two four-channel computer subdivision constant-current pump (24): one was used to add solvents into the biological sampling bottle (21) (work 1 minute to add 5-10 ml solvents), the other was used to suck the concentrated $PM_{2.5}$ samples from the biological sampling bottle (21) (work 1 minute to collect 5-10 ml samples). Solenoid valve with relay (22) was set between the two computer subdivision constant-current pump (24) to make them work at the same time (open 1 minute, close 59 minutes). The concentrated $PM_{2.5}$ samples sucked by constant-current pump (24) was collected into a sample tube on a test-tube turntable by automatic distillate collector (23) preparing to make other analysis.

During the concentrating procedure, two SMPS were used to calculate the number/mass concentration of particles (10-1000 nm): one was connected with concentrated gas path, the other was connected with real gas path. Shown as in Tab. 1, condensed factor and condensed efficiency of this instrument was calculated. The flow of two SMPS were set as 0.3 L/min. As for this, when the SMPS was connected into concentrated gas path, the rest flow of 4.7 L/min was kept in concentrated gas path. Meanwhile, a drying pipe was used in front of the SMPS to prevent water vapor.

What is claimed:

1. A online $PM_{2.5}$ concentrated collection instrument comprising: a $PM_{2.5}$ cutting head, a water tank system, a virtual cropping system, a condenser circulation system and online concentrated collection system;

wherein the $PM_{2.5}$ cutting head comprises three levels of cutting head: $PM_{10}$, $PM_5$ and $PM_{2.5}$, and each stage comprises an impact orifice plate and an impact separation collector plate, the structure of the three stage impact orifice plates being the same, and a number and aperture of the three-stage impact separation collection plates being different;

wherein a water tank (9) in the water tank system holds deionized water, an inner wall of the water tank (9) comprises a temperature insulation layer (10), which is used for heat preservation of the deionized water in the water tank (9), the water tank comprises a viewing window (11) on one side of the water tank (9) for observing water surface height inside the water tank, an electrical heating rod (12) with a temperature sensor for heating the deionized water, and a temperature-controlled digital display device (13) for controlling the temperature of the deionized water, and wherein the water tank system is connected with the $PM_{2.5}$ cutting head;

wherein the virtual cropping system comprises a virtual cutter (17), a concentrated air vacuum pump (2), and a main air vacuum pump (3), the virtual cutter (17) comprising a nozzle (19), a nozzle receiver (20) and two gas paths: a main gas path and concentrated gas path, wherein a coaxial set with the nozzle (19) and the nozzle receiver (20) is arranged to receive particles sprayed out from the nozzle (19), the main air vacuum pump (3) is connected with an upper main part gas outlet (18) of the virtual cutter (17) through a connecting pipe comprising a drying pipe (4) and a mass flow controller (5), and the drying pipe (4) used to dry airflow to avoid excessive water vapor damage to a pump body of the main air vacuum pump (3), and the mass flow controller used to precisely control pipe flow; wherein concentrated air vacuum pump (2) is connected with an upper concentrated part gas outlet of the virtual cutter (17), and the connecting pipe comprises a float flowmeter used to calculate the pipe flow; wherein the condenser circulation system comprises a condensing circulation tube (6) and a condensing machine (8); the condensing circulation tube (6) including a condensing inner tube (14) which is tightly wound by a soft copper spiral tube (15), the ends of which are connected with an outlet and an inlet of the condensing machine (8), respectively; wherein an insulation layer (16) is enclosed outside the spiral tube (15) to keep the temperature of the condensing circulation tube independent of external temperature, and the condenser circulation system uses circulating condensate to grow saturated particles;

wherein a flow outlet of the water tank (9) is coaxially arranged with a beginning of the condensing inner tube (14) in the condensing circulation system and connected by a quick flange, and an ending of the condensing inner tube (14) is connected with the nozzle (19) in the virtual cropping system; and wherein the online concentrated collection system further comprises a biological sampling bottle (21), a solenoid valve with relay (22), an automatic distillate collector (23) and two four-channel computer subdivision constant-current pumps (24); wherein the biological sampling bottle (21) is connected with the condensing circulation tube (6) and the virtual cutter (17) and used to connect concentrated saturated particles with deionized water or other organic solvents; wherein one of the four-channel computer subdivision constant-current pumps (24) is used to add solvents into the biological sampling bottle (21), and another of the four-channel computer subdivision constant-current pumps is used to suck concentrated $PM_{2.5}$ samples from the biological sampling bottle (21), wherein the solenoid valve with relay (22) is set between the two computer subdivision constant-current pumps (24) to make them work at the same time, and the concentrated $PM_{2.5}$ samples sucked by constant-current pump (24) is collected into a sample tube on a test-tube turntable by automatic distillate collector (23) preparing to make other analysis.

2. The online $PM_{2.5}$ concentrated collection instrument of claim 1, wherein a condensing agent of the condensing machine (8) is alcohol, the concentration of which is adjustable to reach an effect of cooling and reducing volatilization.

3. The online $PM_{2.5}$ concentrated collection instrument of claim 1 wherein the condensing inner tube (14) has a length of 80 cm and a diameter of 2.5 cm.

4. The online $PM_{2.5}$ concentrated collection instrument of claim 1, wherein the diameter of the nozzle is 0.37 cm, the distance between the nozzle (19) and the nozzle receiver (20) was 0.45 cm, and the diameter of the nozzle receiver is 2.5 cm.

5. A method of using the online $PM_{2.5}$ concentrated collection instrument of claim 1, comprising:

putting the $PM_{2.5}$ cutting head (7) in a real atmospheric environment, selecting particles with aerodynamic size less than 2.5 μm, and sucking the selected particles into the water tank (9);

under the viewing window (11), adding deionized water to two thirds of the water tank, using the electrical heating rod (12) to heat the water to 45±2° C. per the temperature-controlled digital display device (13) and keeping the particles in condition of saturation by vapor;

when the particles in condition of saturation pass through the condensing inner tube (14) whose temperature is −19±1° C., condensing the particles and growing the particles up to 3-4 μm;

moving the condensed particles into the virtual cutter (17) and gaining speed from the nozzle (19); the power to gain speed coming from the main gas path and the concentration gas path; wherein a main gas path, a mass flow controller (5) controlled the flow at 50 L/min and in concentration gas path whose flow is 5 L/min, particles are received by the nozzle receiver (20), and as the gas flow drops to one tenth, the concentration of particle concentrates to 10 times;

using the biological sampling bottle (21) to online connect the concentrated saturated particles with deionized water or other organic solvents, using one four-channel computer subdivision constant-current pump (24): to add solvents into the biological sampling bottle (21) for 1 minute to add 5-10 ml of solvents, and using the other to suck the concentrated $PM_{2.5}$ samples from the biological sampling bottle (21) for 1 minute to collect 5-10 ml samples.

6. The method of claim 5 comprising using a condensed factor and condensed efficiency to assess the method; the condensed factor equal to a ratio of the concentration of the particles received by the nozzle receiver (20) to an original concentration of the selected particles in the atmospheric environment including mass concentration, number concentration and chemical compounds concentration, and the condensed efficiency equal to a ratio of the concentration of the particles received by the nozzle receiver (20) to ten times the original concentration of the selected particles in the atmospheric environment.

* * * * *

UNITED STATES PATENT AND TRADEMARK OFFICE
CERTIFICATE OF CORRECTION

PATENT NO. : 11,733,133 B2
APPLICATION NO. : 17/385051
DATED : August 22, 2023
INVENTOR(S) : Jianmin Chen et al.

Page 1 of 1

It is certified that error appears in the above-identified patent and that said Letters Patent is hereby corrected as shown below:

On the Title Page

At [73] Assignee, the name should be Fudan University.

Signed and Sealed this
Fifth Day of November, 2024

Katherine Kelly Vidal
*Director of the United States Patent and Trademark Office*